United States Patent [19] [11] 3,751,596
Tseng [45] Aug. 7, 1973

[54] DATA TRANSMISSION SYSTEM USING COMPLEMENTARY CODING SEQUENCES

[75] Inventor: Samuel C.-C. Tseng, Ossining, N.Y.

[73] Assignee: International Business Machines Corporation, Armonk, N.Y.

[22] Filed: Nov. 29, 1971

[21] Appl. No.: 202,940

[52] U.S. Cl. ............. 179/15 BC, 179/15 A, 325/42
[51] Int. Cl. ............. H04j 3/00
[58] Field of Search ............. 179/15 A, 15 AP, 179/15 BC, 15 BM; 325/42; 340/352, 355, 347 R, 347 DD

[56] References Cited
UNITED STATES PATENTS

| | | | |
|---|---|---|---|
| 3,522,383 | 7/1970 | Chang | 179/15 BC |
| 3,681,579 | 8/1972 | Schweitzer | 325/42 |

*Primary Examiner*—Ralph D. Blakeslee
*Attorney*—John J. Goodwin et al.

[57] ABSTRACT

A data transmission system for transmitting information over a plurality of channels or for multiplexing different information on a single channel is described. The system includes a transmitting station where input data signals are linearly transformed into a complementary pulse sequence and transmitted to a receiving station wherein the transmitted pulses are inversely transformed to recover the original signals. The recovered signals are larger in amplitude than the original input signals by a factor dependent on the number of information channels in the system. Any noise introduced during transmission is not made larger in amplitude with the result that the signal to noise ratio of the received signals is improved. The input signals are supplied to a plurality of encoding devices at the transmitter. The encoding devices include tapped delay line devices having multipliers at the taps that multiply the tapped signals by a plus or minus factor in accordance with the code. The multiplied signals are then combined to produce a pulse sequence which is transmitted to the receiving station. At the receiving station the pulse sequence is applied to a plurality of decoding devices. The decoding devices include tapped delay line devices having multipliers at the taps which multiply the tapped signals by a plus or minus factor according to a code which is complementary to the code used at the transmitting station. The multiplied signals are then combined to recover the original input signal which is increased in amplitude by a given factor. The system may be embodied in acoustic surface wave structures wherein the encoding and decoding devices are interdigital transducers.

10 Claims, 16 Drawing Figures

United States Patent [19]
Tseng
[11] 3,751,596
[45] Aug. 7, 1973
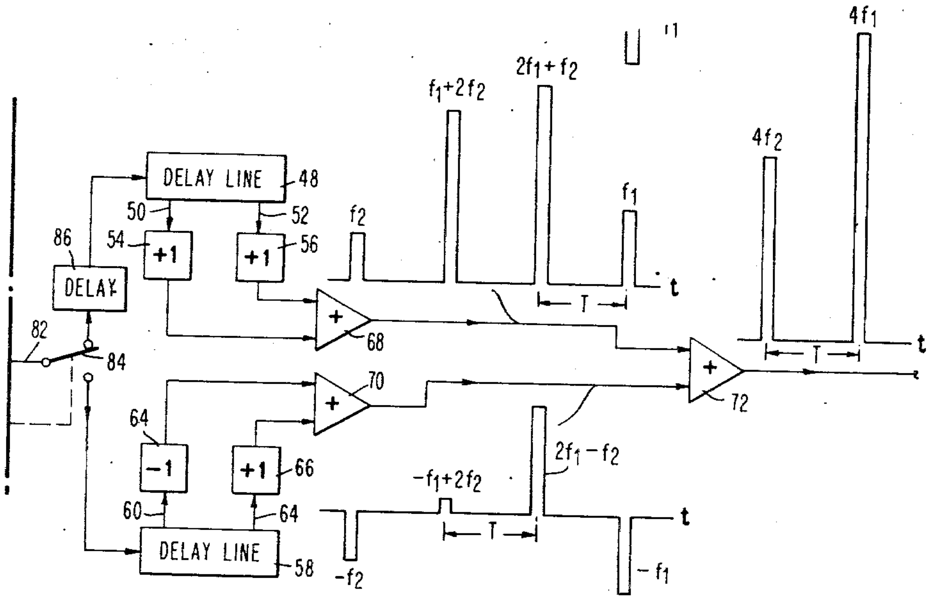

DATA TRANSMISSION SYSTEM USING COMPLEMENTARY CODING SEQUENCES

BACKGROUND OF THE INVENTION

1. Field of the Invention

The present invention relates to data transmission systems wherein the data is transformed at the transmitter prior to transmission and inversely transformed at the receiver after transmission to recover the original data.

2. Description of the Prior Art

Prior art systems are known wherein prior to sending data signals they are first transformed into their Fourier transform. The Fourier transforms of the signals are transmitted instead of transmitting the original signals directly. Subsequently, the original signals are recovered at the receiver by an inverse Fourier transformation. Since the transformed transmitted signal at one instant (for time function) or at one position (for spatial function) is the linear combination of the original signals over a length of time or over an area of space, if noise occurs during transmission, the noise is distributed over the entire signal domain when inverse transformation is performed at the receiving station. Thus, the noise effect is reduced. One example of this technique is the use of a hologram to transmit a picture instead of sending the original picture directly.

A serious drawback in the use of Fourier transformations is the difficulty in the implementation of the transformations by existing electronic components. In the present invention transformations by complementary vector sets are used instead of Fourier transformations with the result that the invention may be implemented with simple inexpensive compact structures such as delay lines or acoustic wave devices.

Two prior art patents have been noted which are related to data transmission using coding. The first reference is U. S. Pat. No. 3,089,921 to M. E. Hines, issued May 14, 1963, and assigned to Bell Telephone Laboratories, Inc. The Hines' device is a physical implementation of what is known as a Hadamard transformation whereas the present invention is an implementation of an orthogonal matrix of complementary sequence which differs from Hines in both mathematical concept and structure. The Hadamard transformation used by Hines is based on matrix multiplication, and therefore, can be implemented with center tapped transformers and resistors. The Hines transformation cannot be implemented with surface wave devices as can the present invention. The transformation of the present invention is characterized by convolution and, therefore, can be best implemented using surface wave devices. On the other hand, the transformation of the present invention cannot be implemented by center tapped transformers and resistors, as shown by Hines. Also, transformers and resistors are bulky in size, require magnetic cores and coils and consume considerable electrical power, whereas surface wave devices as can be employed in the present invention consume little electrical power and can be fabricated easily and inexpensively on the surface of a substrate and can be integrated with silicon transistor chips.

A further distinction over the Hines device which uses the Hadamard transform is that if an nxn matrix is used the noise can be reduced by a factor of n for single transformations and ($n^2$) for double transformations (which are not taught by Hines). The present invention uses an nxn matrix of sequences with lengths of $m$, therefore, noise can be reduced by a factor of (nm) for single transformations and $(nm)^2$ four double transformations.

The other reference is U. S. Pat. No. 3,551,837 issued Dec. 29, 1970, to J. M. Speiser et al. and assigned to the United States of America. This patent is concerned with a delay line which has two transducers in a single substrate. One input transducer changes an electrical signal into a coded elastic signal and the other transducer decodes the elastic signal back into an electrical signal. The coded signal is inside a crystal and is not used outside of the device. The code is used primarily for wave shaping.

The present invention, on the other hand, is concerned with a complete transmission system where the signal is encoded, for example, with a surface wave device at a transmitting terminal. Thus, the output signal is still electrical and is not an elastic wave. The coded electrical signal can be transmitted through a coaxial cable to a remote receiving station where the coded electrical signal is decoded back to the original signal. The coding in the present invention is used for reducing errors or noises occurring in the transmission line.

The Speiser et al. system uses the well known Golay complementary pair of sequences whereas this invention uses a matrix of complementary sequences, more than a pair. The present invention uses an nxn matrix to construct an n channel transmission system where serial processing of independent channels or parallel processing by sending a character of $n$ bits at one time can be performed. In either case, the system of the present invention provides noise and error immunity which is not true of the Speiser et al device.

SUMMARY AND OBJECTS

An object of the present invention is to provide a data transmission system having an improved signal to noise ratio.

Another object of the present invention is to provide a data transmission system using transformations to reduce error and noise occurring during transmission.

A further object of the present invention is to provide a data transmission system using transformations of signals based on an orthogonal matrix of complementary sequence.

Still another object of the present invention is to provide a data transmission system which may be implemented using acoustic surface wave technology.

The foregoing and other objects, featurs and advantages of the invention will be apparent from the following more particular description of preferred embodiments of the invention, as illustrated in the accompanying drawings.

DESCRIPTION OF THE PREFERRED EMBODIMENTS

Figures 1, 2A, 3A:
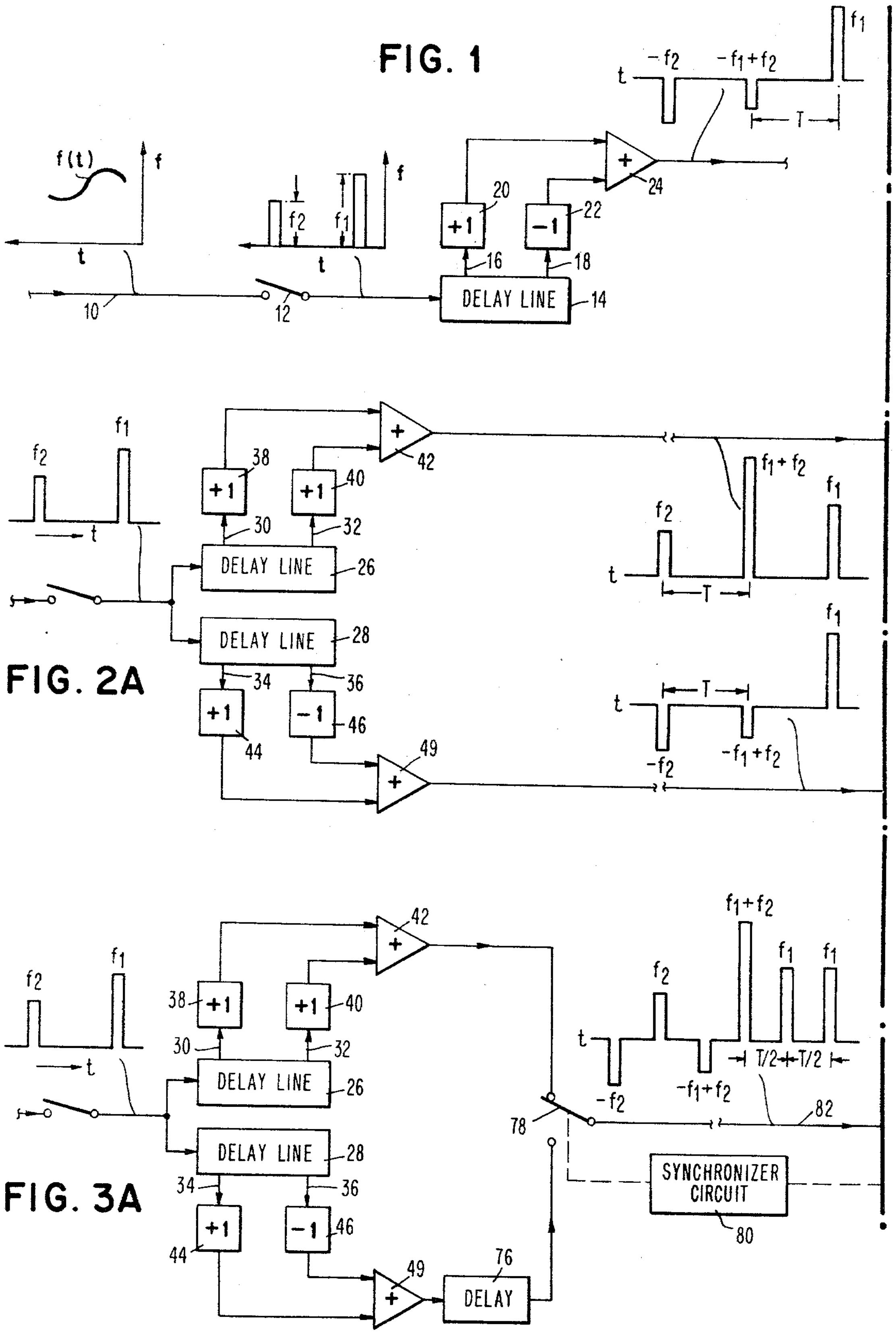
FIG. 1 is a schematic drawing of an encoding circuit which may be used in the embodiment of the present invention.
FIGS. 2A and 2B are a schematic drawing illustrating an embodiment of a data transmission system in accordance with the principles of the present invention.
FIGS. 3A and 3B form a schematic drawing illustrating how the embodiment of FIGS. 2A and 2B can be modified to employ a single transmission line.

Referring to FIG. 1, a simple example of an encoding unit is illustrated which is a basic element of the complete system. In FIG. 1 an input line 10 is connected through a sampling device 12 to a tapped delay line 14. For simplicity sampling device 12 is shown as a switch which is opened and closed at the desired sampling rate. However, other signal sampling devices known in the art may be employed. An incoming signal f(t) is present on line 10 and is sampled to provide a discrete sequence represented in FIG. 1 as $f_1$ and $f_2$. The discrete sequence is applied to delay line 14 which may be a simple coaxial transmission line, an L-C lumped delay line or, as later described, an elastic surface wave delay line.

Delay line 14 has two taps 16 and 18, which are in turn connected to signal multipliers 20 and 22. Multiplier 20 multiplies tapped signal by plus one and the signal, therefore, remains unchanged. Multiplier 22 multiplies a tapped signal by minus one and, therefore, functions as an inverter. As the sampled signal is transmitted down delay line 14 a signal will be produced when portion $f_1$ reaches tap 16 producing a $+f_1$ signal from the output of summing means 24. The delay between taps 16 and 18 is selected to be equal to the time spacing "T" between the sampled signals. Thus when the $f_1$ sampled signal reaches tap 18 the $f_2$ sample is at tap 16. The output of multiplier 20 is $+f_1$ and the output of multiplier 22 is $-f_2$ and the amplitude of the resultant signal from summing means 24 is $(-f_1+f_2)$. Finally, the $f_2$ sampled signal reaches tap 18 and produces a $-f_2$ signal from multiplier 22 through summing means 22. The total output signal from the encoder is $(f_1, -f_1 + f_2, -f_2)$. The encoder of FIG. 1 has, therefore, transformed the signal $F=(f_1,f_2)$ into a new signal $G=(f_1, -f_1+f_2, -f_2)$ by using a delay means that is coded (+1, −1).

The above operation can be expressed mathematically by $F \otimes A = G$ where $$F=(f_1,f_2) \quad (1)$$

$$A=(+1,-1) \quad (2)$$

$$G=(f_1,-f_1+f_2,-f_2) \quad (3)$$

$\otimes$ denotes convolution

Figure 2:
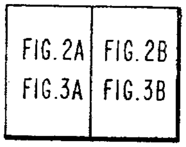
FIG. 2 is a drawing showing how FIGS. 2A and 2B and FIGS. 3A and 3B should be combined.
Figures 2B, 3B:
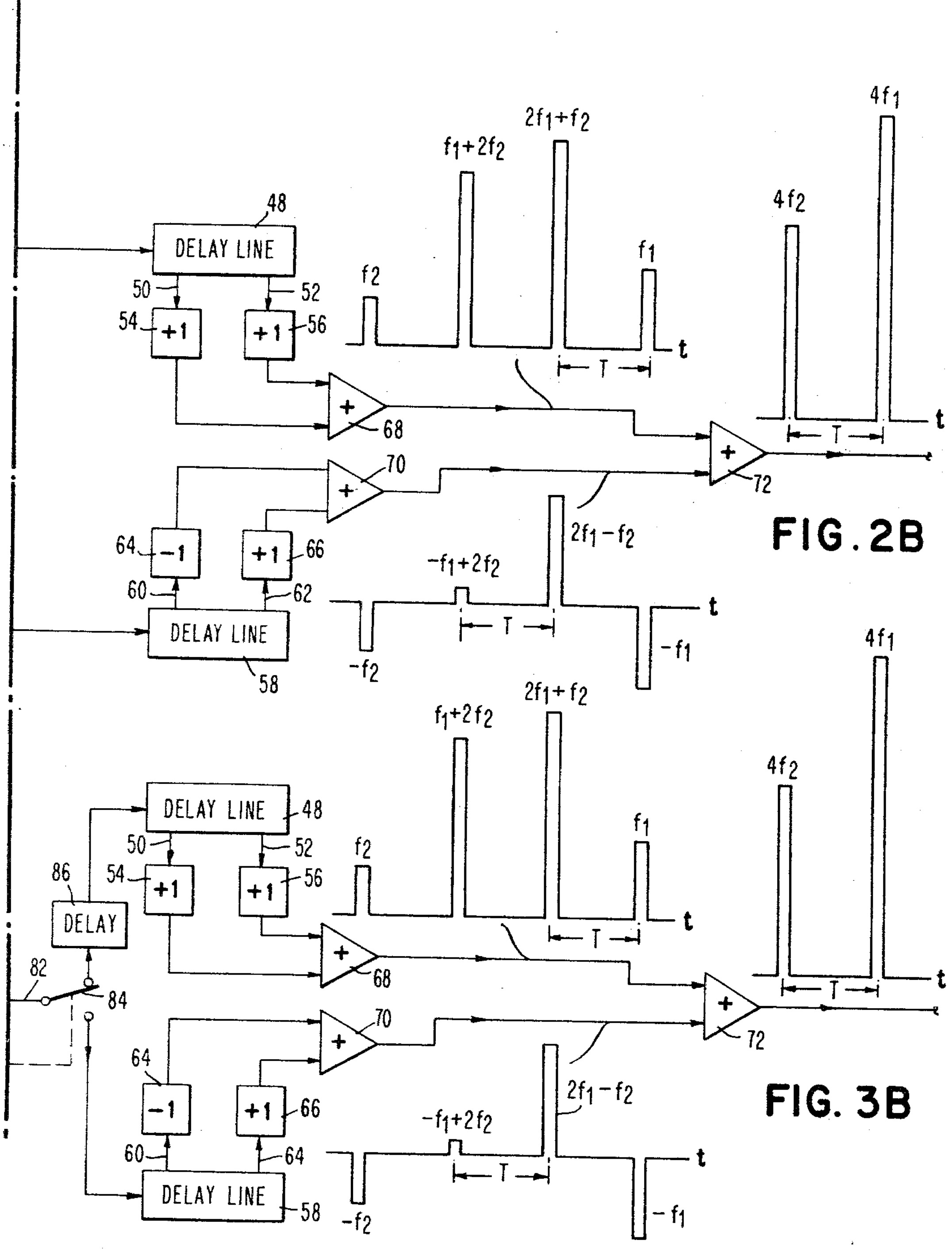

The basic encoding block described in FIG. 1 is shown incorporated into a communication system shown in FIGS. 2A and 2B. A sampled signal $F=(f_1, f_2)$ is introduced into a first delay line 26 and a second delay line 28. Again, the delay between taps 30 and 32 of delay line 26 and taps 34 and 36 of delay line 28 are designed to be equal to the sampling rate and, therefore, equal to the time spacing T between samples $f_1$ and $f_2$. Taps 30 and 32 are connected respectively to multipliers 38 and 40 each of which multiply a tapped signal by plus one. Consequently, the output signal from summing means 42 is $(+f_1, +f_1+f_2, +f_2)$. Taps 34 and 36 of delay line 28 are connected respectively to multipliers 44 and 46. Multiplier 44 multiplies the tapped signal by plus one and multiplier 46 multiplies the tapped signal by minus one. By following the $(f_1,f_2)$ signal through delay line 28 it can be seen that the output signal from summing means 49 is $(+f_1, -f_1+f_2, -f_2)$. The above operation is expressed mathematically as follows:

$$F=(f_1,f_2) \quad (4)$$

$$A_1=(+1,+1) \quad (5)$$

$$A_2=(+1,-1) \quad (6)$$

$$F_1 \otimes A_1 = G_1 = (+f_1, +f_1+f_2, +f_2) \quad (7)$$

$$F_1 \otimes A_2 = G_2 = (+f_1, -f_1+f_2, -f_2) \quad (8)$$

After encoding the two signals $G_1$ and $G_2$ are transmitted along separate lines to a receiving station. At the receiving stations a set of decoding delay lines are employed to recover the original signal. The decoding delay lines at the receiver are complementary to the encoding delay lines. That is, they are coded in sequences which are obtained by reversing the order of the encoding sequences.

Thus, delay line 48 at the receiver has two taps 50 and 52 time spaced by T and connected respectively to two multipliers 54 and 56. Multiplier 54 multiplies the tapped signal by plus one and multiplier 56 multiplies the tapped signal by plus one. Thus $\tilde{A}_1$ for encoding delay line 48 is (+1, +1). This is the reverse of $A_1$ but does not appear so because both multipliers 38 and 40 multiplied by plus one, delay line 58 has two taps 60 and 62 spaced by time T which are respectively connected to multipliers 64 and 66. Multiplier 64 multiplies the tapped signal by minus one and multiplier 66 multiplies the tapped signal by plus one. Thus, where $A_2=(+1,-1)$, at the decoder $\tilde{A}_2=(-1,+1)$.

Since the input to delay line 48 is $G_1=(+f_1, +f_1+f_2, +f_2)$, the output from summing means 68 is $(+f_1, +$ $2f_1 + f_2, +f_1 + 2f_2, + f_2$) which will be referred to as $S_1$. Likewise, the input to delay line 58 is $G_2 = (+f_1, - f_1 + f_2, - f_2)$; the output from summing circuit 70 is $S_2 = (-f_1, + 2f_1 - f_2, - f_1 + 2f_2, - f_2)$. The values of $S_1$ and $S_2$ in terms of $f_1$ and $f_2$ can be easily determined by noting the value of $f_1$ and $f_2$ produced at the taps and summing the values as the incoming signals $G_1$ and $G_2$ are sequenced in the delay line.

The outputs $S_1$ from summing means 68 and $S_2$ from summing means 70 are summed together at summing means 72. As can be seen from FIGS. 2A and 2B, the first terms $f_1$ and $-f_1$ cancel. The summation of $2f_1 + f_2$ and $2f_1 - f_2$ result in a total of $4f_1$, the terms $f_1 + 2f_2$ and $-f_1 + 2f_2$ summed together result in $4f_2$ and the last terms $f_2$ and $-f_2$ cancel to produce a final signal $4f_1, 4f_2$. This is the original signal F with a multiplication factor of four. Thus, with the system of FIGS. 2A and 2B, the original signal is transformed into a new set of signals and is recovered at the receiving station.

An advantage of the system illustrated in FIGS. 2A and 2B is that transmission errors are minimized. Assume that a burst noise denoted by $n$ is unintentionally introduced into one of the transmission lines by error or external interference. If the noise is introduced into $G_1$, the signal plus noise will be respectively, $$G_1 = (f_1, + f_1 + f_2 + n, f_2)$$
$$G_2 = (f_1, - f_1 + f_2, - f_2)$$

After passing through the decoding delay lines 48 and 58 the outputs from summing circuits 68 and 70 will be respectively, $$S_1 = (f_1, + 2f_1 + f_2 + n, + f_1 + 2f_2 + n, f_2)$$
$$S_2 = (-f_1, + 2f_1 - f_2, - f_1 + 2f_2, - f_2).$$

The output from summing circuit 72 will, therefore, be $$(0, +4f_1 + n, + 4f_2 + n, 0) = 4F + n.$$

The signal to noise ratio of the received signal is 4:1 whereas the signal to noise ratio of the received signal would be 1:1 as the original signal was sent directly through transmission lines without encoding. Thus, the system of FIGS. 2A and 2B, increases the signal to noise ratio by a factor of four.

In FIGS. 2A and 2B, two transmission lines were employed to convey the signals $S_1$ and $S_2$. The two transmission lines can be replaced by a single transmission line provided that proper synchronized switches and delay units are used as shown in FIGS. 3A and 3B. In FIG. 2, the two delay line encoders sent out pulses at the same time. The $+f_1$ pulse from summing means 42 occurs at the same time as the $+f_1$ pulse from summing circuit 49. After a time interval T, the $+f_1 + f_2$ pulse from summing circuit 42 and the $-f_1 + f_2$ pulse from summing circuit 49 also occur at the same time, and so forth.

In FIGS. 3A and 3B, the encoding and decoding delay element portions are the same as in FIG. 2 and have been given the same reference numbers. The output from one of the summing circuits of the encoder, for example summing circuit 49, is connected to a delay circuit 76 that delays the pulse a time duration equal to T/2 where T is the sampling rate. The encoder produces a series of pulses as follows. First, a $+f_1$ pulse is produced from summing circuit 42, then a $+f_1$ pulse is produced T/2 time later from delay circuit 76, then a $+f_1 + f_2$ pulse is produced from summing circuit 42 at a time T/2 after the preceding pulse, then a $-f_1 + f_2$ pulse is produced from delay circuit 76 at T/2 time later, and so forth, until an entire sequence of pulses $(+f_1, + f_1, + f_1 + f_2, - f_1 + f_2, + f_2, - f_2)$ is produced with the pulses separated by a time interval of T/2. A switch 78 is provided which is switched in synchronism with the pulse rate. Thus, synchronizing means 80 operates switch 78 at every T/2 time interval such that the aforesaid sequence of pulses are connected onto a single transmission line 82. Consequently, the two pulse sequences from summing means 42 and delay circuit 76 are interleaved on transmission line 82 with the pulses from summing circuit 42 occurring ahead of the corresponding pulses from delay circuit 76.

At the receiving or decoding station, the T/2 time difference between the two pulse sequences must be eliminated so that the two sequences reach delay lines 48 and 58 at the same time. A switch 84 is provided at the input to the decoder and is switched by synchronizing means 80 at intervals of T/2 so that on pulse sequence, the odd pulses on line 82 in FIG. 3, are directed to delay line 48 and the even pulses are directed to delay line 58. However, a delay circuit 86 is connected between switch 84 and delay line 48 to provide a delay of T/2 to the $(+f_1, + f_1 + f_2, + f_2)$ pulses so that the pulses of the two sequences $(+f_1, + f_2 + f_2, + f_2)$ and $(+f_1, -f_1 + f_2, - f_2)$ occur at the same time.

Delay line 48 along with multipliers 54, 56 and summing circuit 68 produce a pulse sequence $(+f_1, + 2f_1 + f_2, + f_1 + 2f_2 + f_2)$. Likewise, delay circuit 58 along with multipliers 64, 66 and summing circuit 70 produce a pulse sequence $(-f_1, + 2f_1 - f_2, - f_1 + 2f_2, -f_2)$. These two sequences are added together in summing circuit 72 to produce a resultant pulse sequence $(0, + 4f_1, + 4f_2, 0)$. Thus, the original signal $F = f_1, f_2$ is recovered at the decoder multiplied by a factor of four. Again, if any noise was introduced into the signal during transmission the signal to noise ratio of the resultant decoded signal will be a factor of four to one.

Figure 4A:
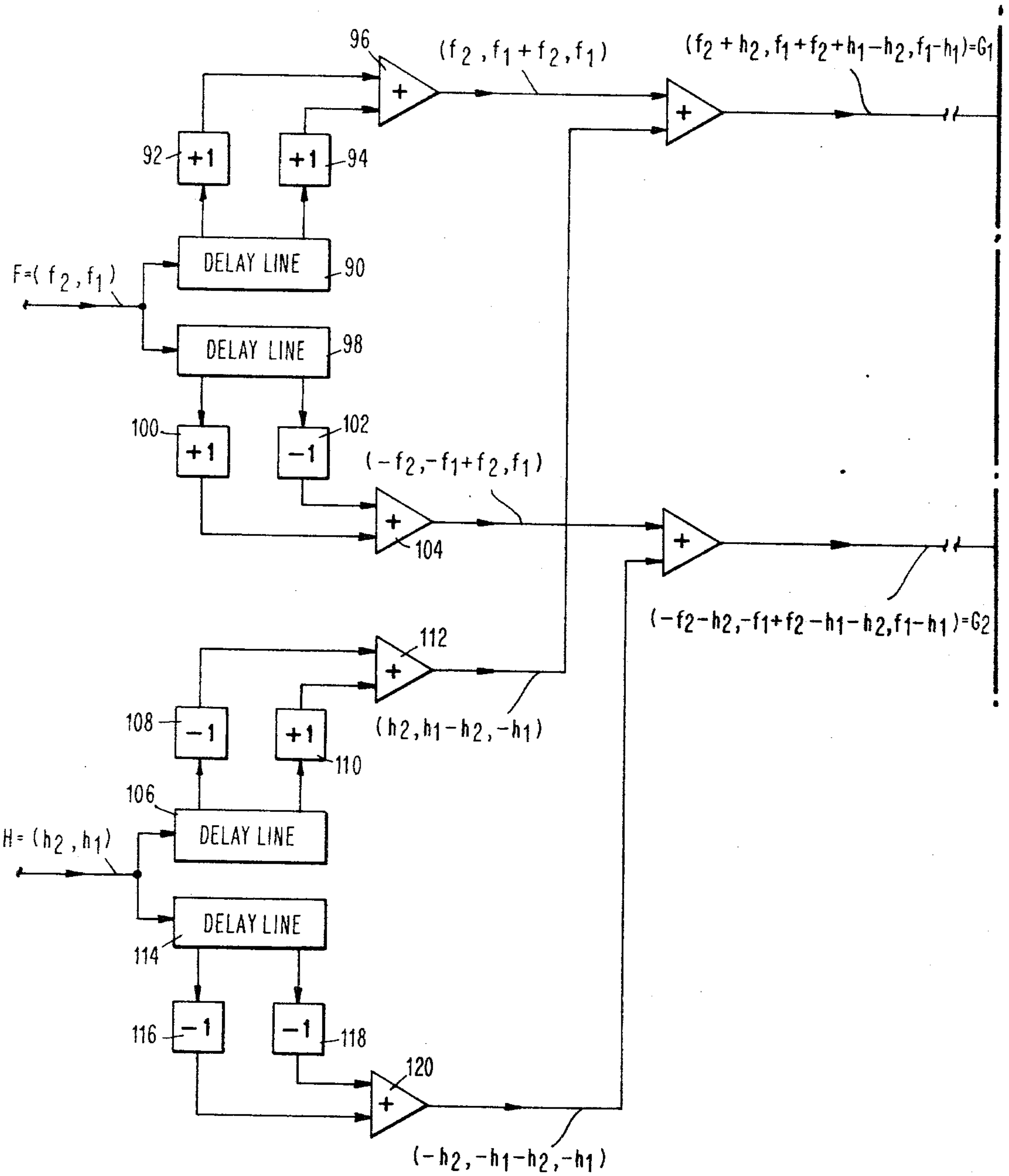
FIGS. 4A and 4B form a schematic drawing illustrating another embodiment of a data transmission system in accordance with the principles of the present invention.

Heretofore, the described embodiments involved one input signal F. With the present invention it is possible to process a number of input signals in parallel by multiplexing techniques. Referring to FIGS. 4A and 4B a system is shown wherein two signals $F = (f_2, f_1)$ and $H = (h_2, h_1)$ are transmitted. As in FIG. 3, the input signal F is sampled (not shown) to produce the pulses $f_2, f_1$ which are applied to a delay line 90, multipliers 92 and 94, and summing means 96 to produce the three pulse sequence $(+f_2, + f_1 + f_2, + f_1)$. The sampled pulses $f_1$ and $f_2$ are also applied to delay line 98, multipliers 100 and 102, and summing means 104 to produce the three pulse sequence $(-f_2, -f_1 + f_2, + f_1)$.

The H input signal is also sampled to produce the pulses $h_1$ and $h_2$ which are applied to delay line 106, multipliers 108 and 110 and summing means 112 to produce the three pulse sequence $(h_2, h_1 - h_2, - h_1)$. Note the multiplier 108 multiplies by minus one. The $h_2$ and $h_1$ pulses are also applied to delay line 114, negative multipliers 116 and 118 and summing circuit 120 to produce the three pulse sequence $(-hd_2, - h_1 - h_2, - h_1)$. The output of summing means 96 and 112 are combined at summing means 122 to produce the sequence $G_1 = (f_2 + h_2, f_1 + f_2 + h_1 - h_2, f_1 - h_1)$. The outputs of summing means 104 and 120 are combined at summing means 124 to produce the pulse sequence $G_2 = (-f_2 - h_2, - f_1 + f_2 - h_1 - h_2, f_1 - h_1)$. The two sequences $G_1$ and $G_2$ are shown being transmitted on separate transmission lines; however, a single transmission line may be used in FIGS. 4A and 4B if an arrangement of T/2 delay means and synchronized switches are provided as shown in FIG. 3.

The two signals F and H have been encoded into pulse sequences by the delay line encoder circuits which will be referred to as $A_1$, $A_2$, $B_1$ and $B_2$, where $A_1$ represents delay line 90, multipliers 92 and 94 and summing means 96; $A_2$ represents delay line 98, multipliers 100 and 102 and summing means 104; $B_1$ represents delay line 106, multipliers 108 and 110, and summing means 112; and $B_2$ represents delay lines 114, multipliers 116 and 118 and summing means 120. The mathematical expression for the encoding is given as follows:

$$\begin{bmatrix} G_1 \\ G_2 \end{bmatrix} = \begin{bmatrix} A_1 B_1 \\ A_2 B_2 \end{bmatrix} \otimes \begin{bmatrix} F \\ H \end{bmatrix} \qquad (9)$$

where ⊗ represents convolution. Expansion of the matrix is the same as that for a conventional matrix except that multiplication in the conventional matrix is replaced by convolution. The expansion is carried out as follows:

$$\begin{bmatrix} G_1 \\ G_2 \end{bmatrix} = \begin{bmatrix} F\otimes A_1 + H\otimes B_1 \\ F\otimes A_2 + H\otimes B_2 \end{bmatrix} \qquad (10)$$

Figure 4:
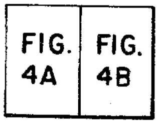
FIG. 4 is a drawing showing how FIGS. 4A and 4B should be combined.
Figure 4B:
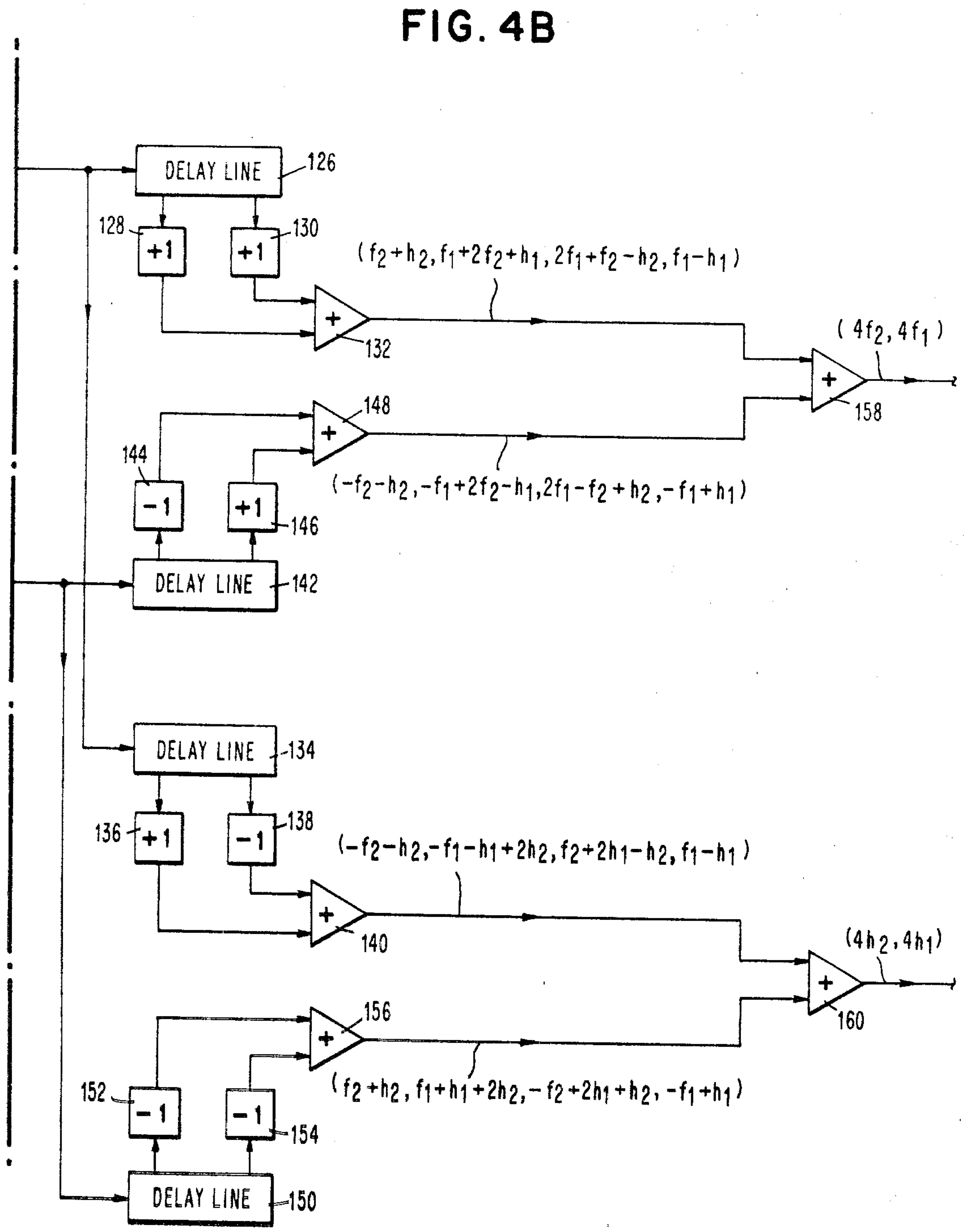

In order that the receivber (decoder) portion of the system can recover the original signal F and H, the coding of $A_1$, $A_2$, $B_1$ and $B_2$ is not arbitrary, but is related by the following characteristics:

$$\begin{bmatrix} \overleftarrow{A_1}\,\overleftarrow{A_2} \\ \overleftarrow{B_1}\,\overleftarrow{B_2} \end{bmatrix} \otimes \begin{bmatrix} A_1 B_1 \\ A_2 B_2 \end{bmatrix} = (nm) \begin{bmatrix} 1 & 0 \\ 0 & 1 \end{bmatrix} \qquad (11)$$

where $n$ is the number of channels processed in parallel ($n$ is 2 in FIGS. 4A and 4B) and m is the length of the sequence used to code the delay line devices ($m$ is 2 in FIG. 4). In FIG. 4, the $G_1$ signal is applied to delay line devices 126 and 134. In delay line device 126, multipliers 128 and 130 and summing means 132, the $G_1$ pulses are decoded into the pulse sequence $(f_2 + h_2, f_1 + 2f_2 + h_1, 2f_1 + f_2 - h_2, f_1 - h_2)$ and in delay line device 134, multipliers 136 and 138 and summing means 140 the $G_1$ pulses are decoded into the pulse sequence $(-f_2 - h_2, -f_1 - h_1 + 2h_2, f_2 + 2h_1 - h_2, f_1 - h_1)$. Likewise, the $G_2$ pulses are applied to delay line devices 142 and 150. In delay line device 142 multipliers 144 and 146 and summing means 148, the $G_2$ pulses are decoded into the sequence $(-f_2 - h_2, -f_1 + 2f_2 - h_2, 2f_1 - f_2 + h_2, -f_1 + h_1)$ and in delay line device 150, multipliers 152 and 154 and summing circuit 156 the $G_2$ pulses are decoded into the sequence $(f_2 + h_2, f_1 + h_1 + 2h_2, -f_2 + 2h_1 + h_2, -f_1 + h_1)$.

The output pulse sequence from summing means 132 and 148 are combined in summing means 158. Because of the opposite polarities most of the terms cancel out leaving two pulses $4f_2$, $4f_1$ which is the original F signal multiplied by a factor of four. The output pulse sequence from summing means 140 and 156 are combined in summing means 160. Again, because of the polarity differences, the pulses cancel leaving the two pulses $4h_2$, $4h_1$. Thus, the H signal is recovered by a factor of four. In the embodiment of FIG. 4, the number of channels $n$ is two and the length of the sequence used to code the delay line devices is also two. The produce (nm) as used in expression (11) is, therefore four which accounts for the output having a ratio of four to one. In the embodiment of FIGS. 4A and 4B, as in FIGS. 3A and 3B, any noise occurring on the transmission line is not multiplied by four so that the signal to noise ratio in the system of FIG. 4 is 4:1.

The embodiment of FIGS. 4A and 4B is a very simple example of the present invention wherein the number of channels $n$ is two and the length of the coding sequence $m$ is also two. In practice, systems can be constructed using longer coding sequences and employing a greater number of information channels processed in parallel. Referring to expression (10), the mathematical expression for the transformation of the original signals into a new set of signals in the transmission line is shown. The inverse transformation which takes place at the receiving station to recover the original signals is set forth as follows:

$$\begin{bmatrix} F \\ H \end{bmatrix} = \frac{1}{(nm)} \begin{bmatrix} \overleftarrow{A_1} & \overleftarrow{A_2} \\ \overleftarrow{B_1} & \overleftarrow{B_2} \end{bmatrix} \otimes \begin{bmatrix} G_1 \\ G_2 \end{bmatrix} \qquad (12)$$

and when expanded is shown as:

$$\begin{bmatrix} F \\ H \end{bmatrix} = \frac{1}{(nm)} \begin{bmatrix} (\overleftarrow{A_1}\otimes G_1 + \overleftarrow{A_2}\otimes G_2) \\ (\overleftarrow{B_1}\otimes G_2 + \overleftarrow{B_2}\otimes G_2) \end{bmatrix} \qquad (13)$$

wherein "⊗" is convolution and represents a coded delay line device and "+" is a summation and represents a summing device.

In order to design a larger system having longer coding sequences, and employing a greater number of parallel channels the dimensions of the coding matrix is expanded to a larger one, such as:

$$\begin{bmatrix} G_1 \\ G_2 \\ G_3 \\ G_4 \\ \cdot \\ \cdot \\ G_n \end{bmatrix} = \begin{bmatrix} A_1 & B_1 & C_1 & D_1 & \ldots & n_1 \\ A_2 & B_2 & C_2 & D_2 & \ldots & n_2 \\ A_3 & B_3 & C_3 & D_3 & \ldots & n_3 \\ A_4 & B_4 & C_4 & D_4 & \ldots & n_4 \\ \cdot & \cdot & \cdot & \cdot & & \cdot \\ \cdot & \cdot & \cdot & \cdot & & \cdot \\ A_n & B_n & C_n & D_n & \ldots & n_n \end{bmatrix} \otimes \begin{bmatrix} F_1 \\ F_2 \\ F_3 \\ F_4 \\ \cdot \\ \cdot \\ f_n \end{bmatrix} \qquad (14)$$

and the inverse transformation $$\begin{bmatrix} F_1 \\ F_2 \\ F_3 \\ F_4 \\ \cdot \\ \cdot \\ F_n \end{bmatrix} = \frac{1}{(nm)} \begin{bmatrix} \overleftarrow{A_1} & \overleftarrow{A_2} & \overleftarrow{A_3} & \overleftarrow{A_4} & \ldots & \overleftarrow{A_n} \\ \overleftarrow{B_1} & \overleftarrow{B_2} & \overleftarrow{B_3} & \overleftarrow{B_4} & \ldots & \overleftarrow{B_n} \\ \overleftarrow{C_1} & \overleftarrow{C_2} & \overleftarrow{C_3} & \overleftarrow{C_4} & \ldots & \overleftarrow{C_n} \\ \overleftarrow{D_1} & \overleftarrow{D_2} & \overleftarrow{D_3} & \overleftarrow{D_4} & \ldots & \overleftarrow{D_n} \\ \cdot & \cdot & \cdot & \cdot & & \cdot \\ \cdot & \cdot & \cdot & \cdot & & \cdot \\ \overleftarrow{n_1} & \overleftarrow{n_2} & \overleftarrow{n_3} & \overleftarrow{n_4} & \ldots & \overleftarrow{n_n} \end{bmatrix} \otimes \begin{bmatrix} G_1 \\ G_2 \\ G_3 \\ D_4 \\ \cdot \\ \cdot \\ G_n \end{bmatrix} \qquad (15)$$

The original signals in n channels can be respectively recovered as long as the coding matrix has the same characteristics as equation (11), namely, the convolution of the two operating matrices is a unit matrix, that is:

$$\begin{bmatrix} \overleftarrow{A_1} & \overleftarrow{A_2} & \overleftarrow{A_3} & \overleftarrow{A_4} & \cdots & \overleftarrow{A_n} \\ \overleftarrow{B_1} & \overleftarrow{B_2} & \overleftarrow{B_3} & \overleftarrow{B_4} & \cdots & \overleftarrow{B_n} \\ \overleftarrow{C_1} & \overleftarrow{C_2} & \overleftarrow{C_3} & \overleftarrow{C_4} & \cdots & \overleftarrow{C_n} \\ \overleftarrow{D_1} & \overleftarrow{D_2} & \overleftarrow{D_3} & \overleftarrow{D_4} & \cdots & \overleftarrow{D_n} \\ \cdot & \cdot & \cdot & \cdot & & \cdot \\ \overleftarrow{n_1} & \overleftarrow{n_2} & \overleftarrow{n_3} & \overleftarrow{n_4} & \cdots & \overleftarrow{n_n} \end{bmatrix} \otimes \begin{bmatrix} A_1 & B_1 & C_1 & D_1 & \cdots & n_1 \\ A_2 & B_2 & C_2 & D_2 & \cdots & n_2 \\ A_3 & B_3 & C_3 & D_3 & \cdots & n_3 \\ A_4 & B_4 & C_4 & D_4 & \cdots & n_4 \\ \cdot & \cdot & \cdot & \cdot & & \cdot \\ A_n & B_n & C_n & D_n & \cdots & n_n \end{bmatrix} = \begin{bmatrix} 1\,0\,0\,0 \ldots 0 \\ 0\,1\,0\,0 \ldots 0 \\ 0\,0\,1\,0 \ldots 0 \\ \cdots\cdots \\ 0\,0\,0\,0 \ldots 1 \end{bmatrix} \quad (16)$$

Figures 5, 5A:
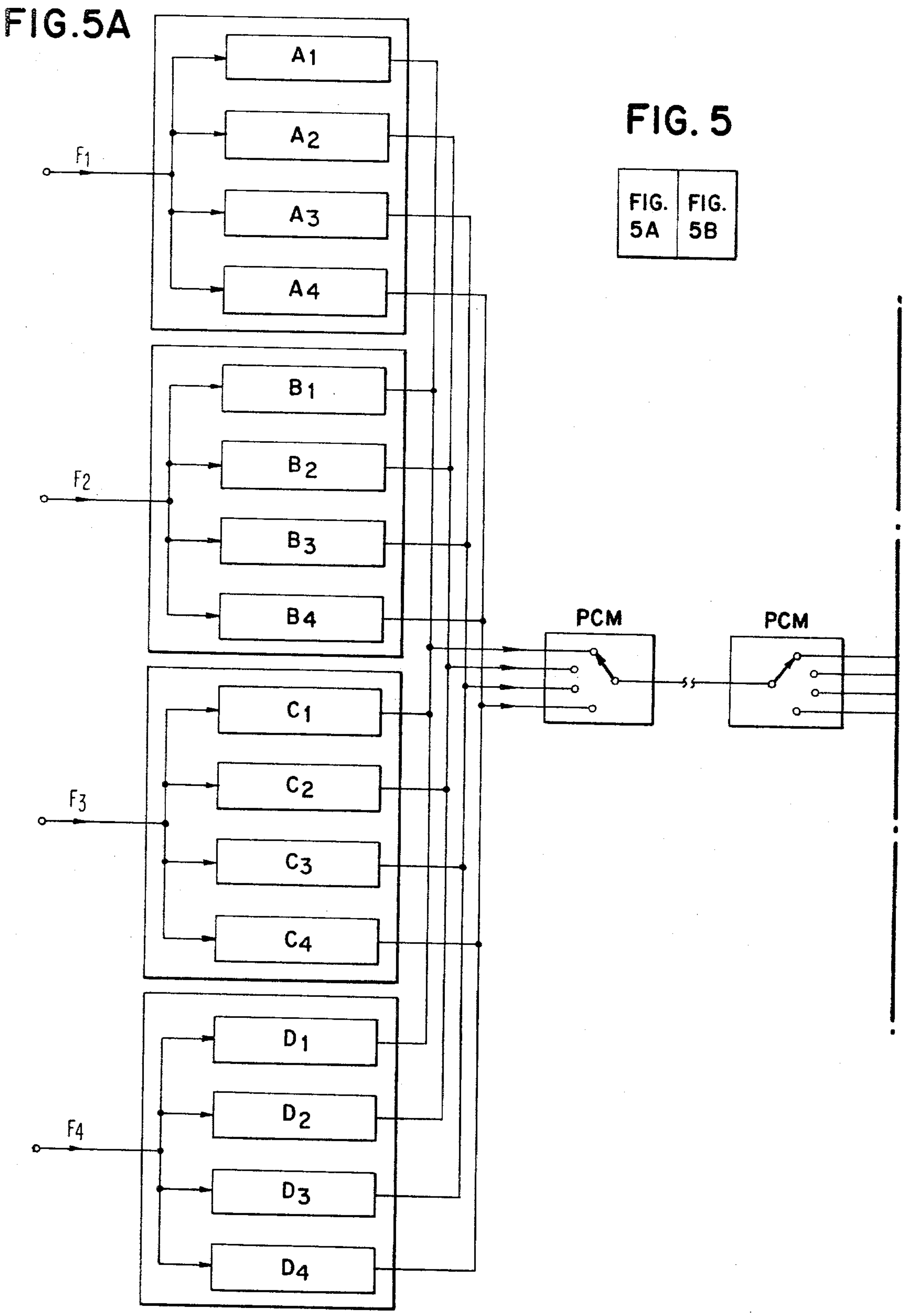
FIG. 5 is a drawing showing how FIGS. 5A and 5B should be combined.
FIGS. 5A and 5B form a schematic drawing illustrating another embodiment of the present invention for a plurality of input signals and incorporating single transformations.
Figure 5B:
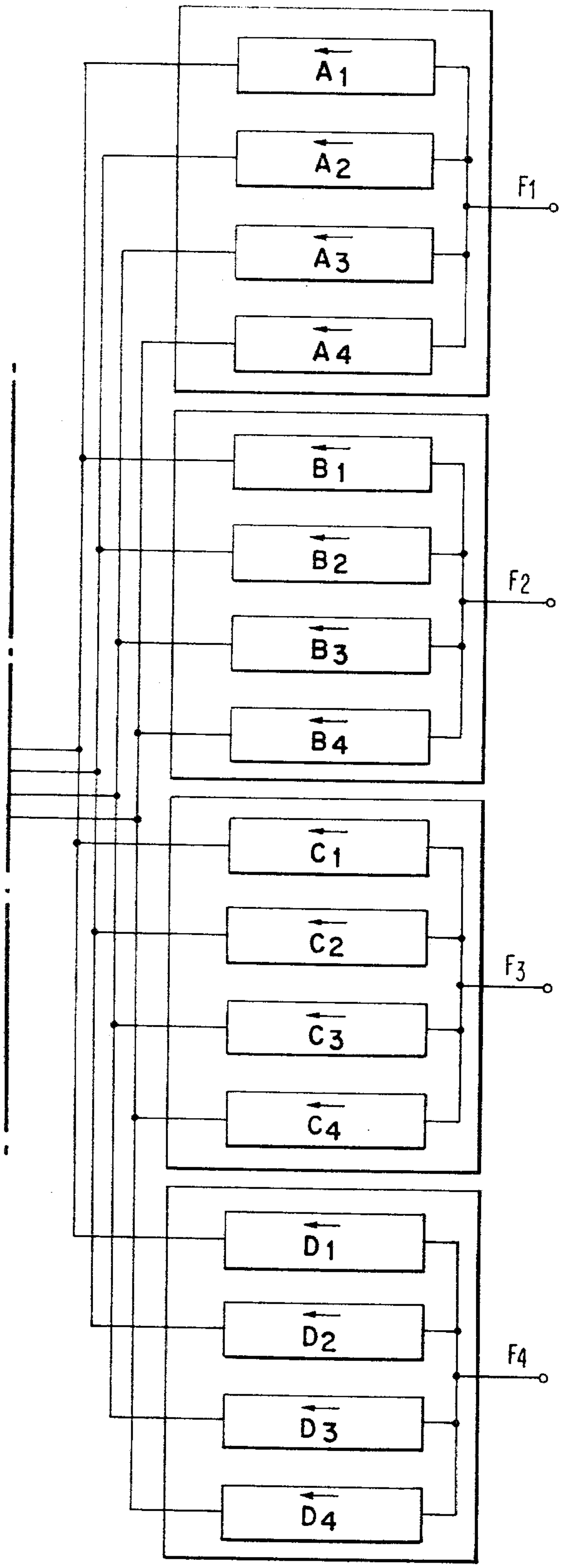

Referring to FIG. 5, the implementation for the system defined by equations 14 and 15 where $n$ is equal to four is shown. The $F_1$ signal is applied to four encoding units, each of which includes a delay line with four taps ($m$=4), for example, which are connected to four multipliers which are in turn connected to a summing circuit. The $F_2$, $F_3$ and $F_4$ signals are connected to the sets of four B, C similar manner. The coding for the various encoders in FIG. 5 may be derived from equations 14 and 15 for $m$ equal to four. The encoding, when derived, is as follows:

$A_1 = +1\ +1\ +1\ +1$
$A_2 = +1\ -1\ +1\ -1$
$A_3 = -1\ -1\ +1\ +1$
$A_4 = -1\ +1\ +1\ -1$
$B_1 = -1\ +1\ -1\ +1$
$B_2 = -1\ -1\ -1\ -1$
$B_3 = +1\ -1\ -1\ +1$
$B_4 = +1\ +1\ -1\ -1$
$C_1 = -1\ -1\ +1\ +1$
$C_2 = -1\ +1\ +1\ -1$
$C_3 = +_1\ +_1\ +_1\ +_1$
$C_4 = +1\ -1\ +1\ -1$
$D_1 = +1\ -1\ -1\ +1$
$D_2 = +1\ +1\ -1\ -1$
$D_3 = -1\ +1\ -1\ +1$
$D_4 = -1\ -1\ -1\ -1$

The coding at the receiving station for the $\overleftarrow{A}$, $\overleftarrow{B}$, $\overleftarrow{C}$ and $\overleftarrow{D}$ devices is the reverse of the A, B, C and D encoding which is as follows:

$A_1 = +1\ +1\ +1\ +1$
$A_2 = -1\ +1\ -1\ +1$
$A_3 = +1\ +1\ -1\ -1$
$A_4 = +1\ -1\ -1\ +1$
$B_1 = +1\ -1\ +1\ -1$
$B_2 = -1\ -1\ -1\ -1$
$B_3 = -1\ +1\ +1\ -1$
$B_4 = -1\ -1\ +1\ +1$
$C_1 = +1\ +1\ -1\ -1$
$C_2 = +1\ -1\ -1\ +1$
$C_3 = +1\ +1\ +1\ +1$
$C_4 = -1\ +1\ -1\ +1$
$D_1 = -1\ +1\ +1\ -1$
$D_2 = -1\ -1\ +1\ +1$
$D_3 = +1\ -1\ +1\ -1$
$D_4 = -1\ -1\ -1\ -1$

The system of FIG. 5 operates in the same fashion as described for FIG. 4 with the exception that it is larger because n is equal to four. The encoded pulse sequence can be transmitted on four separate lines or can be multiplexed onto a single line as shown in FIG. 5 by the use of pulse code modulators (PCM) in a manner well known to those skilled in the art.

Figure 6:
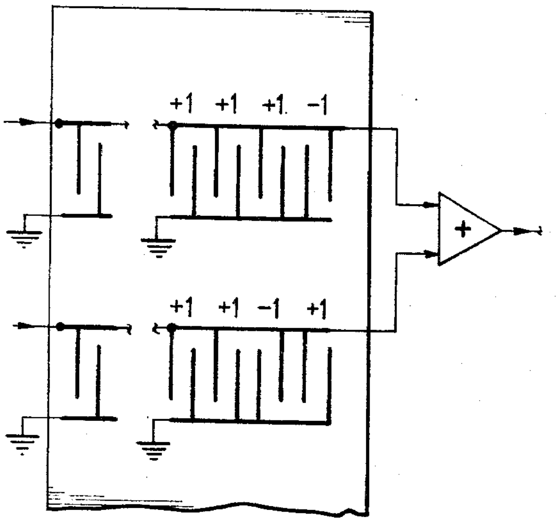
FIG. 6 is a schematic drawing of an acoustic surface wave interdigital transducer which may be employed in the present invention.

The described system may be advantageously implemented in acoustic surface wave technology wherein the signal pulses propagate in a piezoelectric substrate capable of supporting acoustic waves. In such implementation, the delay line devices which are used for coding can be an interdigital transducer. Referring to FIG. 6 a representative pair of such interdigital transducers are shown. It can be seen from FIG. 6 that the fingers of the two tranducers are arranged to code an incoming pulse to produce sequences of +1 +1 +1 −1 and +1 +1 −1 and +1. Interdigital transducers can also be used as the delay elements at the receiver and, in fact, an interdigital transducer may be used in place of the delay line device and associated multiplier elements in the embodiments of FIGS. 2, 3, 4 and 5.

The embodiments of the present invention shown in FIGS. 2, 3, 4 and 5 of the present invention employ a single transform and inverse transform of the original signals. A more elaborate system can also be provided using a double transformation of the original signals and a double inverse transformation to recover the original signal. In the case of the single transformations, the recovered signal was increased by a factor of (nm). In the case of double transformations the recovered signal is increased by a factor of $(nm)^2$ thereby increasing the signal to noise ratios.

The double transformations of the original signal is represented mathematically as follows:

$$\begin{bmatrix} G_1 & G_3 \\ G_2 & G_4 \end{bmatrix} = \begin{bmatrix} A_1 & B_1 \\ A_2 & B_2 \end{bmatrix} \otimes \begin{bmatrix} F_1 & F_3 \\ F_2 & F_4 \end{bmatrix} \otimes \begin{bmatrix} \overleftarrow{A_1} & \overleftarrow{A_2} \\ \overleftarrow{B_1} & \overleftarrow{B_2} \end{bmatrix} \quad (17)$$

and the double inverse transformation is represented by the expression:

$$\begin{bmatrix} F_1 & F_3 \\ F_2 & F_4 \end{bmatrix} = \frac{1}{(nm)^2} \begin{bmatrix} \overleftarrow{A_1} & \overleftarrow{A_2} \\ \overleftarrow{B_1} & \overleftarrow{B_2} \end{bmatrix} \otimes \begin{bmatrix} G_1 & G_3 \\ G_2 & G_4 \end{bmatrix} \otimes \begin{bmatrix} A_1 & B_1 \\ A_2 & B_2 \end{bmatrix} \quad (18)$$

Figure 7A:
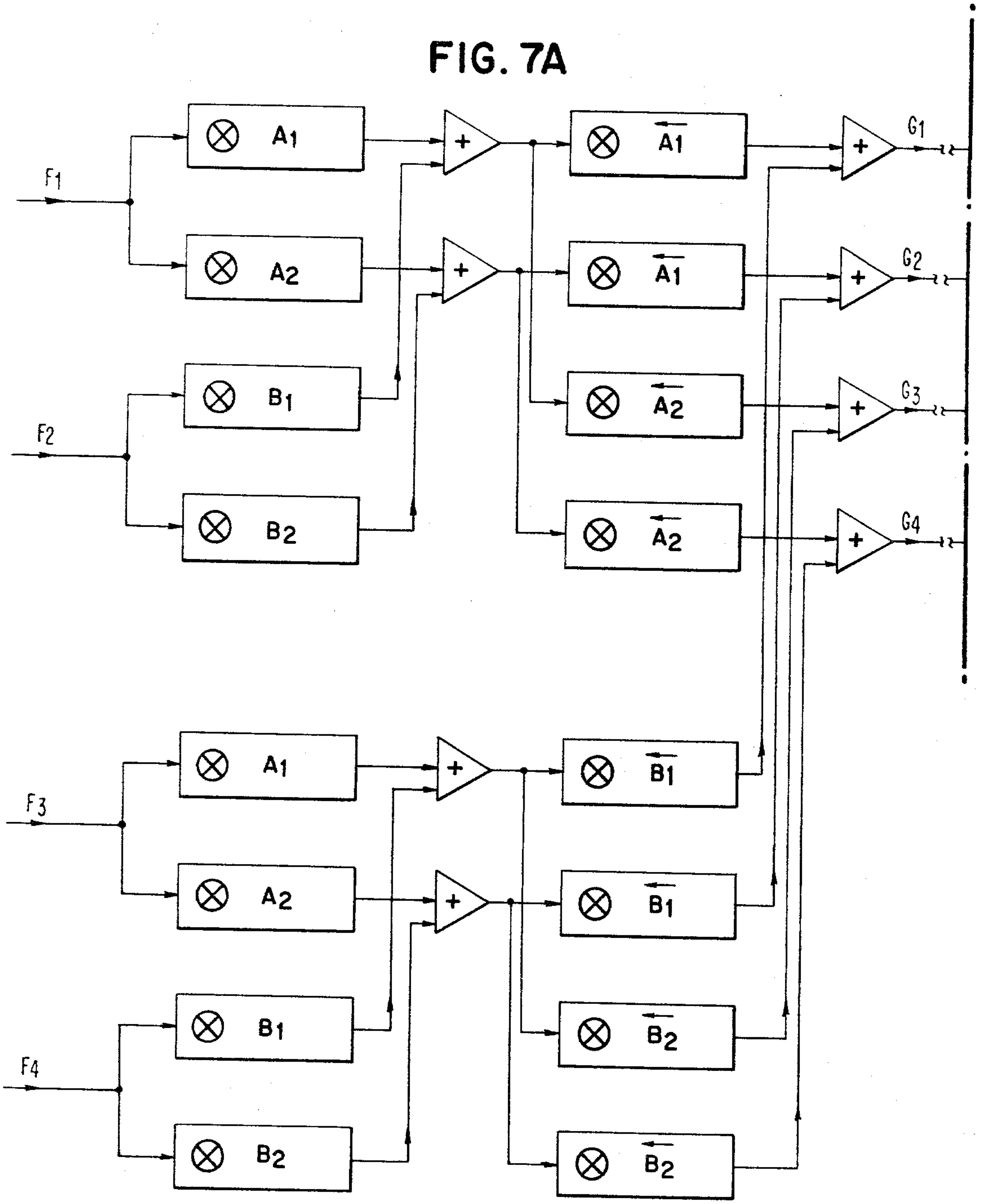
FIGS. 7A and 7B illustrate a schematic drawing of a data transmission system according to the principles of the present invention which incorporates the technique of double transformations.
Figure 7:
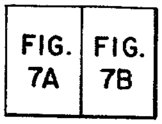
FIG. 7 is a drawing showing how FIGS. 7A and 7B should be combined.
Figure 7B:
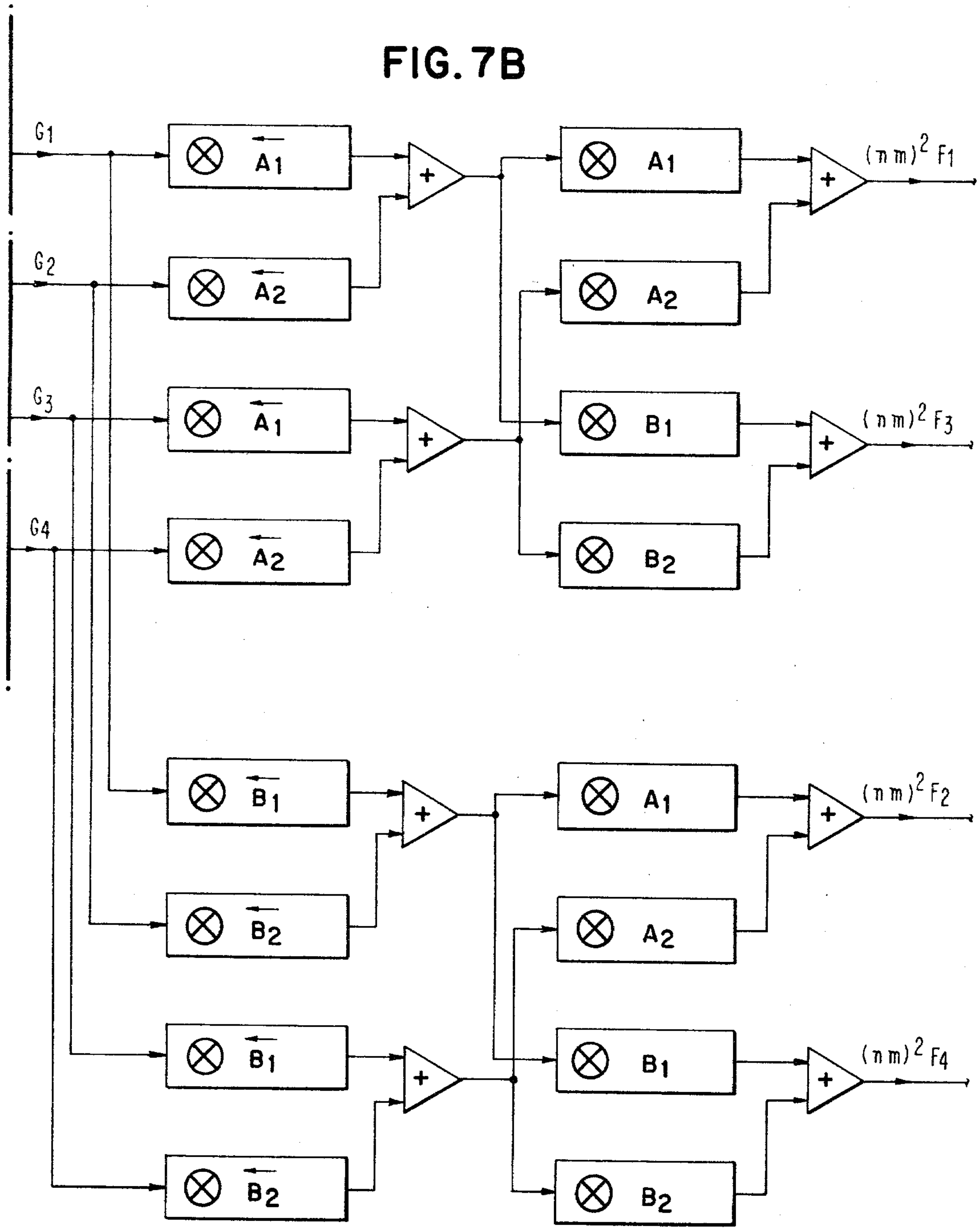

The implementation for the double transformation and the double inverse transformation set forth in expressions (17) and (18) is shown in FIG. 7. In FIG. 7, the boxes ⊗ $A_1$, ⊗ $A_2$, ⊗ $\overleftarrow{A_1}$, etc., represent convolutions as carried out by the combination of a delay line device, multipliers and a summing circuit whereas the triangular figures designated "+" represent a summation. The system of FIG. 7 represents an embodiment of a means of expanding and carrying out the functions set forth in expressions (17) and (18). For example, the $F_1$ signal is applied to the delay line structures designated $\otimes A_1$ and $\otimes$ ' $A_2$. Likewise, the $F_2$ signal is applied to delay line structures to produce the results $F_2 \otimes B_1$ and $F_2 \otimes B_2$. The $F_1 \otimes A_1$ term and the $F_2 \otimes B_1$ term are then summed to produce the term $F_1 \otimes A + F_2 \otimes B_2$ which is in turn operated on by the $\otimes \hat{A}_1$ term. In like manner, one skilled in the art can follow the logical operations set forth in FIG. 7 and see that the operations carried out are the same as the result obtained when equations (17) and (18) are expanded.

What has been described are embodiments of data transmission systems using transformations based on an orthogonal matrix of complementary sequence. Embodiments of both single and double transformations have been provided, and in all cases the systems have the advantage of reducing the effect of errors or noise occurring during transmission. The embodiments may be implemented using surface wave technology. The described systems may be employed for the processing and transmission of voice, sonar, television, and pictorial information and digital data in general.

While the invention has been particularly shown and described with reference to preferred embodiments thereof, it will be understood by those skilled in the art that the foregoing and other changes in form and details may be made therein without departing from the spirit and scope of the invention.

I claim:

1. A data transmission system for transmitting the contents of at least one electrical message signal between a transmitting station and a receiving station comprising:

a transmitter meand including encoding means responsive to said at least one electrical message signal for transforming said at least one message signal into corresponding acoustic waves and then retransforming said acoustic waves into a first and second sequence of coded electrical pulses;

receiving means remote from said transmitter means including decoding means responsive to said first and second sequence of coded electrical pulses for inversely transforming said first and second sequence of coded pulses into a third and fourth sequence of coded pulses, said receiving means further including a summing means connected to said decoding means for combining said third and fourth sequence of coded pulses into a fifth sequence of coded pulses, said fifth sequence of coded pulses being equivalent to said series of at least one message signal except for an integer scale factor.

2. A data transmission system according to claim 1 wherein said transformation by said encoding and decoding means employs transformations of signals based on an orthogonal matrix of complementary sequence.

3. A data transmission system according to claim 1 wherein said encoding and decoding means are acoustic surface wave interdigital transducers.

4. A data transmission system according to claim 1 further including a means for sampling said at least one electrical message a signal at a selected rate to produce a series of sampled pulses;

wherein said transmitter means includes encoding means responsive to said series of sampled pulses for transforming said sampled pulses into corresponding acoustic waves and then retransforming said acoustic waves into a first and second sequence of electrically coded pulses;

and said receiving means includes decoding means responsive to said first and second sequence of electrically coded pulses for inversely transforming said first and second sequence of coded pulses into a third and fourth sequence of coded pulses, said receiving means further including a summing means connected to said decoding means for combining said third and fourth sequence of coded pulses into a fifth sequence of coded pulses, said fifth sequence of coded pulses being equivalent to said series of sampled pulses except for an integer scale factor.

5. A data transmission system according to claim 1 wherein said encoding means includes a first and second delay device responsive to said at least one message signal each of said delay devices having a plurality of taps spaced on said delay device;

a multiplier means connected to each of said taps of each of said delay devices for multiplying to output pulses from said taps by a plus or minus factor in accordance with a selected code;

a first summing means connected to the multipliers for said taps of said first delay device for combining the pulses therefrom to produce a first sequence of coded pulses, and a second summing means connected to the multipliers for said taps of said second delay device for combining the pulses therefrom to produce a second sequence of coded pulses.

6. A data transmission system according to claim 5, further including a delay means connected to the output of said second summing means for delaying said second sequence of coded pulses a predetermined amount;

a transmission line, and synchronizing means between the output of said first summing means, the output of said delay means and said transmission line for multiplexing said first and second sequences of coded pulses on said transmission line.

7. A data transmission system according to claim 5, wherein said decoding means includes a third delay device responsive to said first sequence of coded pulses and having a plurality of taps spaced thereon;

a separate multiplier means connected to each of said taps on said third delay device for multiplying the pulses from said taps by a plus or minus factor inversely to the multipliers connected to the taps on said first delay device;

a third summing means connected to the multipliers for said taps of said third delay device for combining the pulses therefrom to produce a third sequence of coded pulses;

a fourth delay device responsive to said second sequence of coded pulses and having a plurality of taps spaced thereon;

a separate multiplier means connected to each of said taps on said fourth delay device for multiplying the pulses from said taps by a plus or minus factor inversely to the multipliers connected to the taps on said second delay device;

a fourth summing means connected to the multipliers for said fourth delay device for combining the pulses therefrom to produce a fourth sequence of coded pulses, and a fifth summing means connected to the outputs of said third and fourth summing means for combining said third and fourth sequence of coded pulses to produce a fifth sequence of coded pulses, said fifth sequence of coded pulses being equivalent to said at least one message signal except for a scale factor.

8. A data transmission system according to claim 1 including a plurality of sampling means each responsive to a separate input message signal for sampling each of said message signals at a selected rate to produce a plurality of series of sampled pulses;

said transmitter including a plurality of encoding means each responsive to a separate series of sampled pulses for transforming each of said series of sampled pulses into acoustic waves and then into a first and second sequence of coded electrical pulses;

said remote receiving means including a plurality of decoding means each responsive to a separate one of said first and second sequences of coded pulses for inversely transforming each of said first and second sequences of coded pulses into third and fourth sequences of coded pulses, and a plurality of combining means each onnnected to a separate one of said decoding means for combining each of said third and fourth sequences of coded pulses into a fifth sequence of coded pulses, each of said fifth sequence of coded pulses being equivalent to a separate one of said plurality of series of sampled pulses except for an integer scale factor.

9. A data transmission system according to claim 4 wherein said transformations by said plurality of encoding means and said plurality of decoding means employs transformations of signals based on orthogonal matrices of complementary sequences.

10. A data transmission system for transmitting the contents of a plurality of message signals between a transmitting station and a remotely located receiving station, said plurality of message signals being in the form of a plurality of sets of sampled pulses each set being on a separate one of a plurality of input lines comprising a first plurality of delay line encoding devices at said transmitting means arranged in pairs, each pair of said delay line encoding devices being connected to a separate one of said input lines responsive responsie to a separate one of said sets of sampled pulses;

a first plurality of combining means at said transmitting means, each of said combining means being connected to the outputs of delay line encoding devices selected from said pairs of said first plurality of delay line encoding devices to form a first plurality of sequences of pulses which is a first transformation of said plurality of sets of sampled pulses;

a second plurality of delay line encoding devices at said transmitting means arranged in pairs, each pair of said delay line encoding devices of said second plurality being connected to the output of a separate one of said first plurality of combining means;

a second plurality of combining means at said transmitting means, each of said combining means being connected to the outputs of delay line encoding devices selected from said pairs of said second plurality of delay line encoding devices to form a second plurality of sequences of pulses which is a second transformation of said plurality of sets of sampled pulses;

a first plurality of delay line decoding means at said receiving station arranged in pairs, each pair of said delay line decoding means being connected to the output of a separate one of said second plurality of decoding means;

a third plurality of combining means at said receiving means, each of said combining means being connected to the outputs of delay line decoding devices selected from said pairs of said first plurality of delay line decoding means to form a third plurality of sequences of pulses which is a first inverse transformation of said second plurality of pulses from said second plurality of combining means, a second plurality of delay line decoding devics at said receiving means arranged in pairs, each pair of said delay line decoding means of said second plurality being connected to the output of a separate one of said third plurality of combining means, and a fourth plurality of combining means at said receiving means, each of said combining means being connected to the outputs of delay line decoding devices selected from said pairs of said second plurality of decoding devices to perform a second inverse transformation of said second plurality of pulses from said second plurality of combining means to produce a plurality of output signals, each output signal being equivalent to a separate one of said plurality of message signals except for an integer scale factor.

* * * * *